D. L. CROSBIE.
RESILIENT WHEEL.
APPLICATION FILED JUNE 10, 1914.
1,184,229.
Patented May 23, 1916.
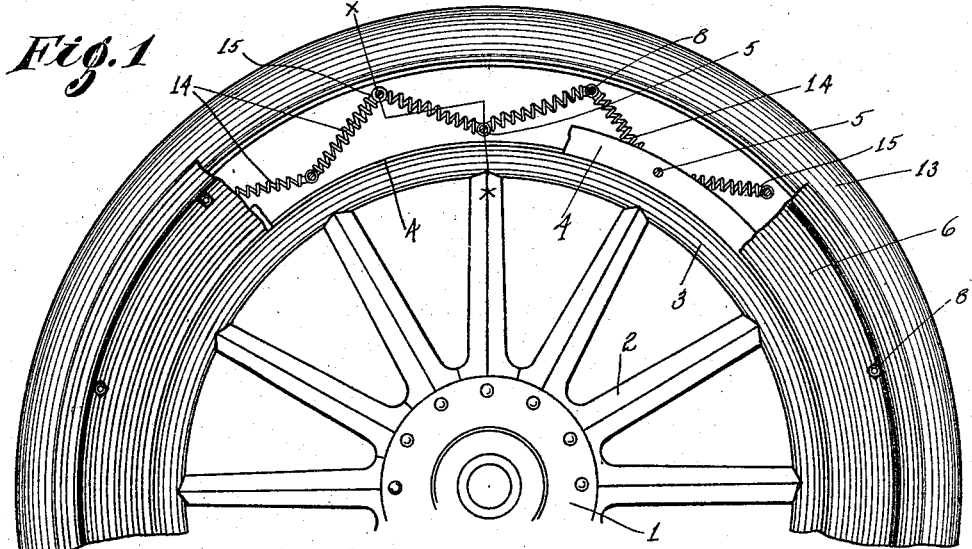
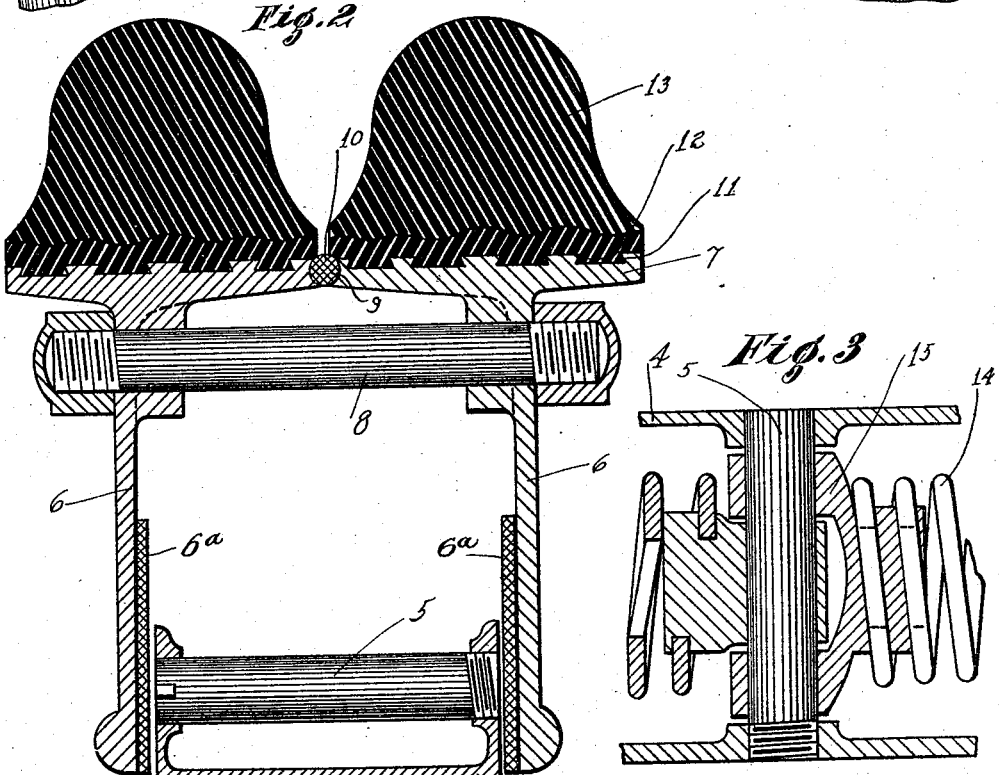
WITNESSES:
J. B. Webster
F. M. Blanchard
INVENTOR.
Daniel L. Crosbie
BY
Percy S. Webster
ATTORNEY

UNITED STATES PATENT OFFICE.

DANIEL L. CROSBIE, OF SACRAMENTO, CALIFORNIA.

RESILIENT WHEEL.

1,184,229.   Specification of Letters Patent.   Patented May 23, 1916.

Application filed June 10, 1914. Serial No. 844,183.

*To all whom it may concern:*

Be it known that I, DANIEL L. CROSBIE, a citizen of the United States, residing at Sacramento, in the county of Sacramento and State of California, have invented certain new and useful Improvements in Resilient Wheels; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in resilient wheels used to displace the now commonly used pneumatic tires, the present invention embodying certain improvements in details of construction over that wheel shown in my issued Patents, Numbers 1,058,221; 1,043,571; and 1,023,416 and dated April 8th, 1913; Nov. 5th, 1912; and April 16th, 1912, respectively.

The present invention embodies certain improvements in the structure of the auxiliary rim and side plates together with the method of fixing the solid tire of said auxiliary rim.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a side elevation of a portion of a wheel partly broken out showing my improved structure. Fig. 2 is a sectional view taken on a line X—X of Fig. 1 the spring being omitted. Fig. 3 is a sectional view of a fragmentary portion of the wheel showing the method of journaling the spring carriers.

Referring now more particularly to the characters of reference on the drawings, the numeral 1 designates the hub of the wheel, 2, the spokes, and 3, the felly. Secured to the felly 3 is the main channel-shaped rim 4 adapted to receive the flush pins or bolts 5.

My improved structure consists in making the side plates 6 and the auxiliary rim 7 integral, such rim being then in two parts so that each side plate 6 and one side of the rim 7 will be removable as a unit, the same being held together when in position on the wheel by cross bolts 8. The inner edges of the rim sections 7 are milled out, as at 9, and interposed between the same is a filler washer 10 to prevent friction and also to make a closed joint to keep dirt or dust from entering therethrough.

The outer surface of each of the members 7 is mortised out, as at 11, to receive a rubber base plate 12 vulcanized to which is the solid outer tire 13, there being two of these tires 13 to each wheel, as shown in Fig. 2.

The springs 14, which are interposed between the inner and outer rims, are suitably mounted on carriers 15, which carriers are in turn journaled on the pins 5 and 8 in the manner shown in Fig. 3.

Between the flanges of the rim 4 and the inner edges of the side plates 6, I have arranged wear strips 6$^a$, which may be of fiber or other suitable material to reduce the frictional wear between the said members 4 and 6.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claim.

Having thus described my invention what I claim as new and useful and desire to secure by Letters Patent is:—

The combination with a wheel having a channel-shaped rim, of an auxiliary rim spaced from said channel-shaped rim and being formed into two annular parts, each part having a component side plate sliding over one of the sides of said channel-shaped rim, the inner edge of each annular part being provided with a semi-circular slot, a washer, annular in cross section, interposed within said slots, means securing said side plates together, and a solid tire carried by each of said annular parts, and a resilient structure between said rims, as described.

In testimony whereof I affix my signature in presence of two witnesses.

DANIEL L. CROSBIE.

Witnesses:
JOHN W. SCHINDLER,
JOHN J. SCHINDLER.

Copies of this patent may be obtained for five cents each, by addressing the "Commissioner of Patents, Washington, D. C."